US011477642B2

(12) United States Patent
Jun et al.

(10) Patent No.: US 11,477,642 B2
(45) Date of Patent: Oct. 18, 2022

(54) METHOD AND APPARATUS FOR ESTABLISHING WIRELESS COMMUNICATIONS CONNECTION

(71) Applicant: Samsung Electronics Co., Ltd., Gyeonggi-do (KR)

(72) Inventors: Tae-Soo Jun, Gyeonggi-do (KR); Seung-ku Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 2 days.

(21) Appl. No.: 16/721,227

(22) Filed: Dec. 19, 2019

(65) Prior Publication Data

US 2020/0128407 A1 Apr. 23, 2020

Related U.S. Application Data

(63) Continuation of application No. 15/248,172, filed on Aug. 26, 2016, now Pat. No. 10,516,993, which is a (Continued)

(30) Foreign Application Priority Data

Apr. 1, 2015 (KR) ........................ 10-2015-0046195

(51) Int. Cl.
*H04W 12/06* (2021.01)
*H04L 9/40* (2022.01)
(Continued)

(52) U.S. Cl.
CPC ......... *H04W 12/06* (2013.01); *H04L 63/0861* (2013.01); *H04W 12/50* (2021.01);
(Continued)

(58) Field of Classification Search
CPC .... H04L 63/0861; H04W 4/80; H04W 76/10; H04W 8/005
See application file for complete search history.

(56) References Cited

U.S. PATENT DOCUMENTS 8,615,290 B2  12/2013  Lin et al.
9,373,047 B2   6/2016  Aoki et al.
(Continued)

FOREIGN PATENT DOCUMENTS

JP    2011048523     3/2011
KR    1020110069356  6/2011
(Continued)

OTHER PUBLICATIONS

Weiss, Chris, Apple Patents Heart-Rate Identification System, http://inventorspot.com/articles/apple_patents_heartrate_indentification_system_4146, Copyright 2006-2016 Halcyon Solutions Inc., pp. 4.
(Continued)

*Primary Examiner* — Zhitong Chen
(74) *Attorney, Agent, or Firm* — The Farrell Law Firm, P.C.

(57) ABSTRACT

A method of operating an electronic device is provided. The method includes acquiring, first biometric information by sensing a physical contact of a user of the electronic device; transmitting first sub-information of the first biometric information to a terminal within a certain time from an instant of acquiring the first biometric information; acquiring, from the terminal, second sub-information of second biometric information of the user who uses the terminal, based on the first sub-information of the first biometric information being matched with first sub-information of the second biometric information; comparing second sub-information of the first biometric information with the second sub-information of the second biometric information acquired from the terminal; and based on a comparison result that the second sub-information of the first biometric information matches the second sub-information of the second biometric information, determining whether to establish a pairing with the terminal through a wireless network.

11 Claims, 9 Drawing Sheets

Related U.S. Application Data continuation of application No. PCT/KR2016/003134, filed on Mar. 28, 2016.

(51) Int. Cl.
  *H04W 12/50* (2021.01)
  *H04W 76/10* (2018.01)
  *H04W 4/80* (2018.01)
  *H04W 8/00* (2009.01)

(52) U.S. Cl.
  CPC .............. *H04W 4/80* (2018.02); *H04W 8/005* (2013.01); *H04W 76/10* (2018.02)

(56) References Cited

U.S. PATENT DOCUMENTS

| | | | |
|---|---|---|---|
| 9,595,143 B1* | 3/2017 | Ashenfelter | ............ G07C 9/257 |
| 2007/0016777 A1* | 1/2007 | Henderson | ............ H04L 63/083 713/169 |
| 2012/0245722 A1 | 9/2012 | Yamamura | |
| 2013/0005266 A1* | 1/2013 | Singh | .................... H04W 76/14 455/41.2 |

FOREIGN PATENT DOCUMENTS

| | | |
|---|---|---|
| KR | 1020130086194 | 7/2013 |
| KR | 1013058103 | 9/2013 |
| KR | 101341212 | 12/2013 |
| KR | 101360843 | 2/2014 |
| KR | 101436760 | 9/2014 |

OTHER PUBLICATIONS

Using the Nymi Band, https://nymi.com/using_the_nymi_band, Copyright 2016, pp. 1.
Israel, Steven A. etc., ECG to identify individuals, Pattern Recognition 38 (2005) 133-142, Copyright 2004 Pattern Recognition Society.
Wang, Yongjin et al., Analysis of Human Electrocardiogram for Biometric Recognition, EURASIP Journal on Advances in Signal Processing 2007 Copyright Yongjin Wang et al. 2008, pp. 3.
Wubbeler, Gerd et al., Verification of humans using the electrocardiogram, Pattern Recognition Letters 28 (2007) 1172-1175, Copyright 2007 Elsevier B.V.
Osowski, Stanislaw et al., Support vector machine-based expert system for reliable heartbeat recognition, IEEE transactions on biomedical engineering, 2004, pp. 1.
Fatemian, S. Zahra et al., A new ECG feature extractor for biometric recognition, 16th international conference on Digital Signal Processing, 2009, pp. 1.
PCT/ISA/237 Written Opinion issued on PCT/KR2016/003134 pp. 5.
PCT/ISA/210 Search Report issued on PCT/KR2016/003134 pp. 4.
Korean Office Action dated Mar. 27, 2021 issued in counterpart application No. 10-2016-0106990, 7 pages.

* cited by examiner

METHOD AND APPARATUS FOR ESTABLISHING WIRELESS COMMUNICATIONS CONNECTION

CROSS-REFERENCE TO RELATED APPLICATION

This continuation application claims priority under 35 U.S.C. § 120 to U.S. patent application Ser. No. 15/248,172, filed on Aug. 26, 2016 in the U.S. Patent and Trademark Office, which is a continuation application of PCT/KR2016/003134, filed on Mar. 28, 2016, which claims priority under 35 U.S.C. § 119(a) to Korean Patent Application No. 10-2015-0046195, filed on Apr. 1, 2015, in the Korean Intellectual Property Office, the entire disclosures of each of which are incorporated herein by reference.

BACKGROUND

1. Field

The present disclosure relates to methods and apparatuses for establishing a wireless communications connection and, more particularly, to methods and apparatuses for establishing a wireless communications connection by using biometric information of a user.

2. Description of the Related Art

Developments in wireless communications technology have facilitated wireless connection of various devices for exchanging information. Connection of wireless communications devices requires a specific user input requesting the connection. For example, a password is entered if a security level for the connection is high while an authentication input of the user is used if the security level is not so high.

Meanwhile, sensor technologies allow collection of biometric information of users by use of small-sized sensors. Collected biometric information for each user has unique characteristics. There is a trend toward researching security and authentication technologies utilizing the biometric information that shows the unique characteristics.

Thus, there is a need for methods and apparatuses for establishing a wireless communications connection utilizing the biometric information of the user.

SUMMARY

A wireless communications connection may be established between devices to be connected through a wireless channel through physical contact of a user without any further input entry of the user.

Since an authentication for the wireless communications connection is performed by using biometric information of the user, there are large advantages in security and reliability.

Utilization of the biometric information may shorten a delay that is caused during the establishment of the wireless communications connection and reduce the number of packet transmission between the devices.

Also, the present disclosure provides non-transitory computer-readable storage media that store program instructions for performing the methods for establishing wireless communications connection. Additional aspects will be set forth in part in the description which follows and, in part, will be apparent from the description, or may be learned by practice of the presented embodiments.

According to an aspect of an embodiment, a method of operating an electronic device is provided. The method includes acquiring, first biometric information by sensing a physical contact of a user of the electronic device; transmitting first sub-information of the first biometric information to a terminal within a certain time from an instant of acquiring the first biometric information; acquiring, from the terminal, second sub-information of second biometric information of the user who uses the terminal, based on the first sub-information of the first biometric information being matched with first sub-information of the second biometric information; comparing second sub-information of the first biometric information with the second sub-information of the second biometric information acquired from the terminal; and based on a comparison result that the second sub-information of the first biometric information matches the second sub-information of the second biometric information, determining whether to establish a pairing with the terminal through a wireless network.

According to another aspect of another embodiment, a method of operating a terminal is provided. The method includes acquiring first sub-information of first biometric information from an electronic device, wherein the first biometric information is acquired based on a physical contact of a user of the electronic device; acquiring second biometric information of the user who uses the terminal by sensing a physical contact of the user of the terminal; comparing first sub-information of the second biometric information with the first sub-information of the first biometric information; based on a comparison result that the first sub-information of the second biometric information matches the first sub-information of the first biometric information, transmitting second sub-information of the second biometric information to the electronic device; and based on the second sub-information of the second biometric information being matched with the second sub-information of the first biometric information, determining whether to establishing a pairing with the electronic device through a wireless network.

According to an aspect of another embodiment, an electronic device is provided. The electronic device includes a sensor; a communicator configured to communicate with a terminal; and at least one processor; wherein the at least one processor is configured to acquire first biometric information by sensing a physical contact of a user of the electronic device; transmit first sub-information of the first biometric information to a terminal within a certain time from an instant of acquiring the first biometric information; acquire, from the terminal, second sub-information of second biometric information of the user who uses the terminal, based on the first sub-information of the first biometric information being matched with first sub-information of the second biometric information; compare second sub-information of the first biometric information with the second sub-information of the second biometric information acquired from the terminal; and based on a comparison result that the second sub-information of the first biometric information matches the second sub-information of the second biometric information, determine whether to establish a pairing with the terminal through a wireless network.

DETAILED DESCRIPTION

Figure 1:
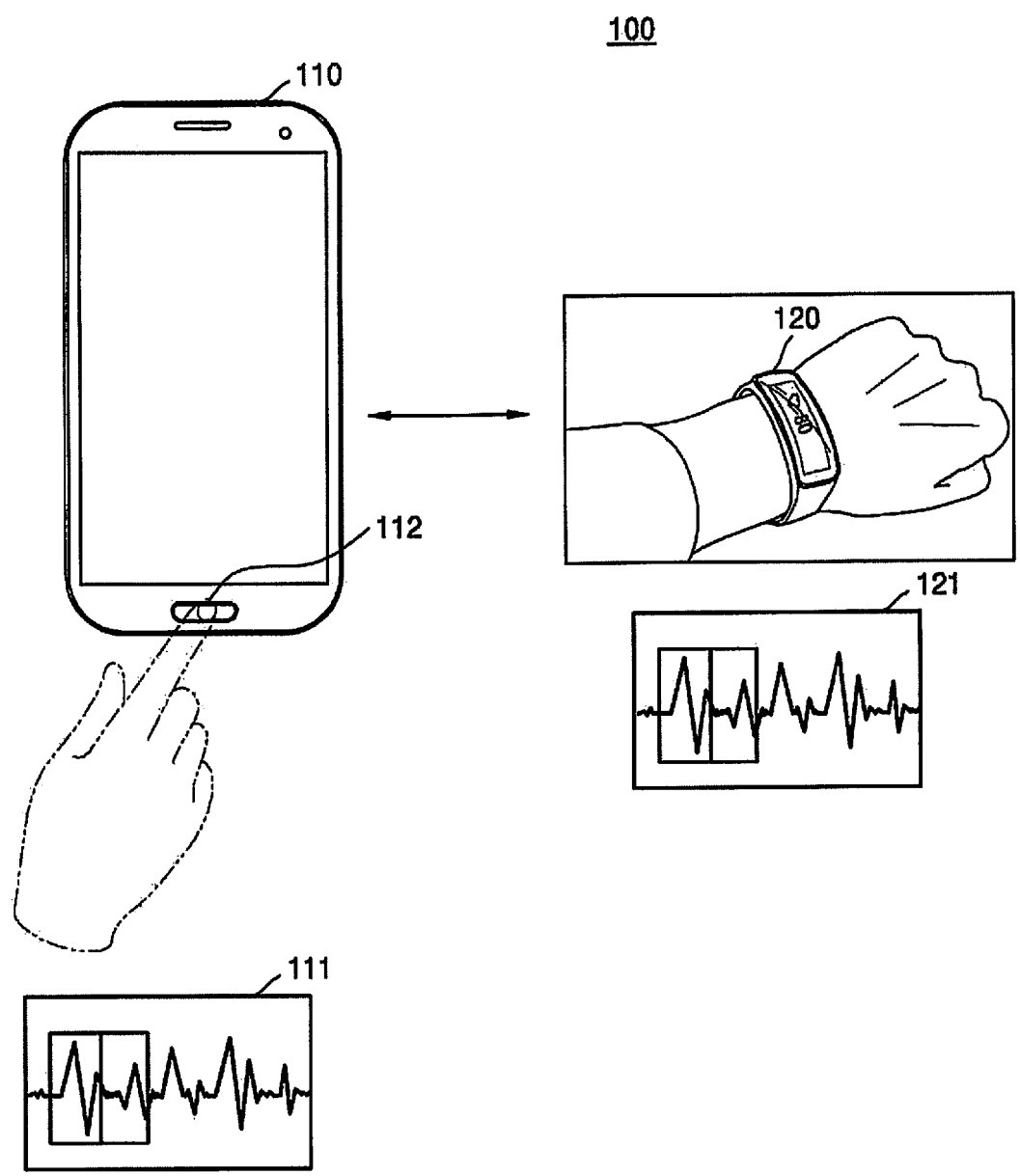
FIG. 1 is a schematic diagram illustrating a wireless communications connection between an electronic device and a terminal, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Although general terms widely used in this disclosure were selected for describing the embodiments in consideration of the functions thereof, these general terms may vary according to intentions of one of ordinary skill in the art, case precedents, the advent of new technologies, and the like. Terms arbitrarily selected by the applicant may also be used in a specific case. In this case, their meanings need to be given in the detailed description of the present disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. Also, the term 'unit' in the embodiments means a software component or hardware components such as a field-programmable gate array (FPGA) or an application-specific integrated circuit (ASIC), and performs a specific function. However, the term 'unit' is not limited to software or hardware. The term 'unit' may be configured to be included in an addressable storage medium or to reproduce one or more processors. Thus, for example, the term 'unit' may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and 'units' may be associated with the smaller number of components and 'units', or may be divided into additional components and 'units'.

Although the terms including an ordinal number such as first, second, etc., can be used for describing various elements, the structural elements are not restricted by the terms. The terms are only used to distinguish one element from another element. For example, without departing from the scope of the present disclosure, a first structural element may be named a second structural element. Similarly, the second structural element also may be named the first structural element. As used herein, the term "and/or" includes any and all combinations of one or more associated items.

Throughout the entire specification, the term "biometric information" refers to information related to an electrocardiogram, fingerprints, an electroencephalogram, temperature, electromyography, blood pressure, a face, a voice, an eyeball, veins, and so on of a user. Also, those having ordinary skill in the art will appreciate that the "biometric information" may represent information acquired from a human body other than the information listed above, which is described in detail below.

Also, throughout the specification, "sub-information" of the biometric information refers to at least some part of the biometric information, or sampled information from the biometric information.

Also, throughout the specification, "pairing" refers to matching an electronic device and a terminal together to make a pair. In other words, the term "pairing" means connecting the electronic device with the terminal through a wireless communications network.

FIG. 1 is a schematic diagram illustrating a wireless communications connection between an electronic device and a terminal according to an embodiment.

Generally, when a terminal 120 is to be connected to an external electronic device 110 through a wireless network, some user input information is required at the terminal 120. For example, in order to establish a Bluetooth connection between the terminal 120 and the external electronic device 110, a user has to send a Bluetooth connection request and additionally enter a pin code.

The electronic device 110 may initiate the wireless communications connection between the electronic device 110 and the terminal 120 by utilizing biometric information of the user. Referring to FIG. 1, the biometric information of the user may be electrocardiographic (ECG) information of the user. The electronic device 110 may acquire the ECG information of the user through a sensor 112. The wireless communications connection may be established by comparing the ECG information 111 acquired by the electronic device 110 with the ECG information 121 acquired by the terminal 120.

If the ECG information 111 acquired by the electronic device 110 is the same as the ECG information 121 acquired by the terminal 120, the user of the electronic device 110 is considered to be identical to the user of the terminal 120 and the electronic device 110 will pair with the terminal 120 through the wireless network. On the other hand, if the ECG information 111 acquired by the electronic device 110 does not match the ECG information 121 acquired by the terminal 120, the user of the electronic device 110 is considered to be different from the user of the terminal 120 and the electronic device 110 will not pair with the terminal 120.

Here, the wireless network may be wireless LAN, Wifi, Bluetooth, Zigbee, Wifi-direct (WFD), ultra-wideband (UWB), Infrared Data Association (IrDA), Bluetooth Low Energy (BLE), or Near Field Communication (NFC), but is not limited thereto.

Although it is shown in FIG. 1 that the electronic device 110 is a smartphone and the terminal 120 is a wearable watch, the electronic device 110 and the terminal 120 may be implemented in various forms in addition to these. The electronic device 110 may be one of communications products including a computer, a smartphone, a personal digital assistant (PDA), a tablet personal computer (PC), a printer, a multifunction copier, and a facsimile, and the terminal 120 may be one of portable devices including earphones, a MP3 player, a smart watch, and smart glasses. Also, the electronic device 110 may be one of electric home appliances including a refrigerator, a washing machine, a television, an air conditioner, a vacuum cleaner, a humidifier, a microwave oven, an iron, an audio system, and a dish washing machine.

Figure 2:
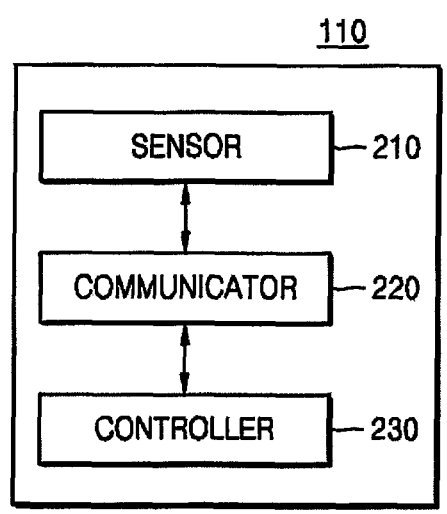
FIG. 2 is a block diagram of an electronic device according to an embodiment.

FIG. 2 is a block diagram of the electronic device according to an embodiment.

According to the embodiment, the electronic device 110 may include a sensor 210, a communicator 220, and a controller 230. The electronic device 110 may be implemented to include more elements than those shown in the drawing, or fewer elements than those shown in the drawing. The elements will now be described in detail sequentially below.

The sensor 210 senses a physical contact of the user and acquires first biometric information based on the sensed physical contact. The sensor 210 may include at least one of an ECG sensor, a fingerprint sensor, an electroencephalogram (EEG) sensor, a temperature sensor, an electromyography (EMG) sensor, and a blood pressure sensor, but is not limited thereto. The first biometric information may be one of the ECG information, fingerprint information, EEG information, temperature information, EMG information, blood pressure information, but is not limited thereto. The sensor 210 may acquire the biometric information of the user in real time.

The communicator 220 may transmit, to the terminal 120, sub-information of the first biometric information within a certain time from an instant that the first biometric information is acquired. The certain time is a time prescribed by the user at the electronic device 110. For example, the communicator 220 may transmit the information to the terminal 120 within two minutes from the acquisition of the first biometric information. The terminal 120 is a device that communicates with the electronic device 110. Also, the communicator 220 may transmit to the terminal 120 an advertisement packet containing the first sub-information of the first biometric information. For example, the communicator 220 may broadcast periodically the advertisement packet containing the first sub-information of the first biometric information. Terminals around the electronic device 110 receiving the advertisement packet may check whether they have information corresponding to the first sub-information of the first biometric information contained in the advertisement packet.

According to an embodiment, in the case that the first biometric information is the ECG information, the sub-information of the first biometric information or second biometric information may include at least one of: amplitude, duration, and angle information of the ECG. Details of the ECG information will be described below with reference to FIG. 4.

According to another embodiment, in the case that the first biometric information is the fingerprint information, the sub-information of the first biometric information or the second biometric information may include at least one of pattern information and bifurcation information of the fingerprint. Details of the fingerprint information will be described below with reference to FIG. 6.

The communicator 220 may receive second sub-information of the second biometric information from the terminal 120 that received the first sub-information of the first biometric information. Here, the second biometric information is acquired from the user by the terminal 120 and is the same type of information as the first biometric information. Also, the second biometric information may be a signal acquired by the terminal 120 within a certain time from the instant that the electronic device 110 acquired the first biometric information.

In more detail, when the first sub-information of the first biometric information matches the first sub-information of the second biometric information, the communicator 220 may receive the second sub-information of the second biometric information from the terminal 120. Here, the communicator 220 may receive, from the terminal 120, an advertisement packet containing the second sub-information of the second biometric information.

The controller 230 may compare second sub-information of the first biometric information that corresponds to the second sub-information of the second biometric information with the second sub-information of the second biometric information. If it is determined from the comparison that the second sub-information of the first biometric information matches the second sub-information of the second biometric information, the controller 230 may control the electronic device 110 so as to establish a pairing between the electronic device 110 and the terminal 120 through the wireless network.

The wireless network according to an embodiment may be the wireless LAN, the Wifi, the Bluetooth, the Zigbee, the WFD, the UWB, the IrDA, the BLE, or the NFC, but is not limited thereto.

The electronic device 110 may include a central processing unit (CPU) to generally control the sensor 210, the communicator 220, and the controller 230. The CPU may be implemented by arrays of multiple logic gates or by a combination of a general purpose microprocessor and a memory which stores a program that may be executed by the microprocessor. Those of ordinary skill in the art will appreciate that the CPU may be implemented by other kinds of hardware components.

The electronic device 110 discriminates and identifies users by utilizing unique biometric information that is different for each user, and provides an enhanced security level.

Also, the electronic device 110 may establish a pairing with the terminal 120 through the physical contact of the user without any further input entry of the user. Utilization of the biometric information based on the physical contact may shorten the delay that is caused during the establishment of the wireless connection and reduce the number of packet transmissions between the electronic device 110 and the terminal 120. In other words, the electronic device 110 may simplify the process of establishing the wireless connection with the terminal 120 by using the biometric information of the user.

Various operations performed by the electronic device 110 and applications thereof are described below. Explicit subjects such as the sensor 210, the communicator 220, and the controller 230 will be omitted in the description that those having ordinary skill in the art would appreciate clearly without specifying the subjects. It should be noted that the scope of the present disclosure is not limited by naming a physical or logical structure of a certain configuration.

Figure 3:
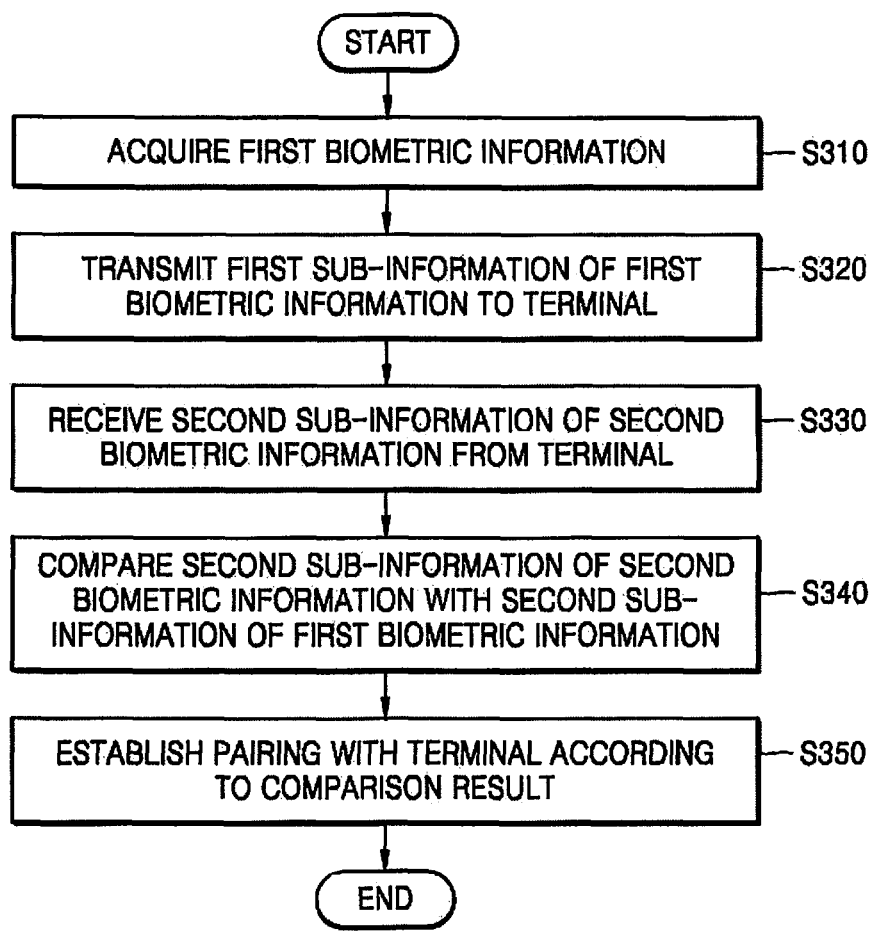
FIG. 3 is a flowchart showing a method for operating an electronic device, according to an embodiment.

FIG. 3 is a flowchart showing a method for operating the electronic device according to an embodiment.

In operation S310, the electronic device 110 acquires the first biometric information. The first biometric information may include at least one of, but is not limited to, the ECG information, the fingerprint information, the EEG information, the temperature information, the EMG information, the blood pressure information. A sensor equipped in the electronic device 110 senses the physical contact of the user and acquires the first biometric information based on the sensed physical contact.

In operation S320, the electronic device 110 transmits the first sub-information of the first biometric information to the terminal 120. The electronic device 110 transmits the first sub-information of the first biometric information to the terminal 120 within the certain time from the acquisition of the first biometric information. For example, the electronic device 110 transmits to the terminal 120 the advertisement packet containing the first sub-information of the first biometric information.

In operation S330, the electronic device 110 receives the second sub-information of the second biometric information from the terminal 120. If the first sub-information of the first biometric information matches the first sub-information of the second biometric information, the electronic device 110 receives the second sub-information of the second biometric information from the terminal 120.

Here, it is assumed that the first biometric information is acquired at first and second instants, where the second instant is later than the first instant. The terminal 120 may compare the second biometric information with the first biometric information acquired at the second instant and check the coincidence between them. The real-time comparison of the biometric information may enhance the security level.

Also, the second biometric information is the same type of information as the first biometric information. The second biometric information may be a signal acquired by the terminal 120 within a certain time from the acquisition of the first biometric information. On the other hand, the second sub-information of the second biometric information to be transmitted to the electronic device 110 may be transferred through the advertisement packet.

In operation S340, the electronic device 110 compares the second sub-information of the second biometric information with the second sub-information of the first biometric information. Here, the second sub-information of the first biometric information corresponds to the second sub-information of the second biometric information. For example, if the first biometric information is the ECG information and the second sub-information is the amplitude of the ECG, the second biometric information is the ECG information also, and the second sub-information of the second biometric information is the amplitude of the ECG.

In operation S350, the electronic device 110 determines whether to establish a pairing with the terminal 120 or not depending on the comparison result in the operation S340. If the second sub-information of the first biometric information matches the second sub-information of the second biometric information, the electronic device 110 establishes a pairing with the terminal 120 through the wireless network.

Figure 4:
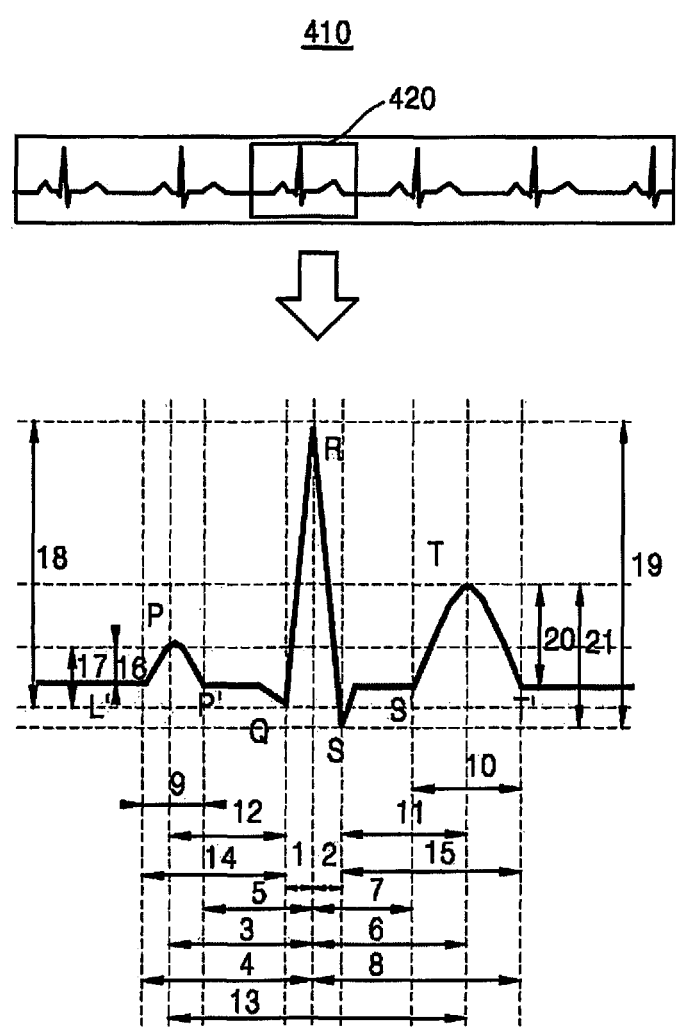
FIG. 4 is a diagram for explaining an electrocardiogram (ECG) utilized in establishing a wireless communications connection between an electronic device and a terminal, according to an embodiment.

FIG. 4 is a diagram for explaining the ECG utilized in establishing a wireless communications connection between the electronic device and the terminal according to an embodiment.

The heart is a pump circulating blood throughout the body, and repeats contraction and expansion periodically. Pumping operation of the heart s performed by the heart muscle's contraction and relaxation. Whenever the heart beats, a weak electrical signal is created and electrical currents derived from the weak electrical signal spread through the body. The ECG denoted by a reference numeral 410 in FIG. 4 is a graph that records potential differences, between electrodes placed on appropriate position of the skins, which arises from the electrical currents.

Referring to portion 420 in FIG. 4, a short P wave represents sequential depolarization of the right and left atria. A QRS wave represents depolarization of the right and left ventricles. A T-wave represents the re-polarization of the ventricles.

According to an embodiment, the ECG may be used to identify users because the morphology of the ECG and range of values in specific regions in the ECG are different for each user. For example, amplitude, time duration, and angle or slope in the ECG may be used to identify the user.

Referring to the portion 420 in FIG. 4, factors that may represent the amplitude of the ECG include PL' 16, PQ 17, RQ 18, RS 19, TS 20, and TT' 21. Factors that may represent the time duration of the ECG include RQ 1, RS 2, RP 3, RL' 4, RP' 5, RT 6, RS' 7, RT' 8, L'P' 9, S'T' 10, ST 11, PQ 12, PT 13, LQ 14, and ST' 15.

The electronic device 110 and the terminal 120 may be connected through the wireless network simply by using the ECG information acquired by the physical contact of the user without any separate input entry or manipulation of the user.

Figure 5A:
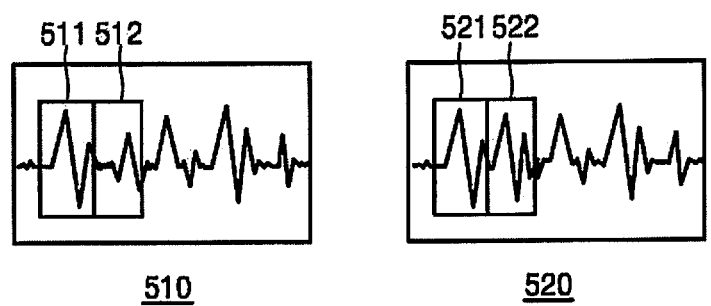
FIG. 5A illustrates an example of an ECG comparison which results in a failure in establishing a wireless communications connection between an electronic device and a terminal, according to an embodiment.

FIG. 5A illustrates an example of ECG comparison which results in a failure in establishing the wireless communications connection between the electronic device and the terminal according to an embodiment.

In FIG. 5A, a reference numeral 510 denotes an ECG acquired by the electronic device 110, and a reference numeral 520 denotes an ECG acquired by the terminal 120. The wireless communications connection between the electronic device 110 and the terminal 120 is established successfully when first ECG information acquired by the electronic device 110 matches second ECG information acquired by the terminal 120. The electronic device 110 compares the first ECG information with the second ECG information. Although the electronic device 110 may use all the values of the first and second ECG information in comparing and determining coincidence of the first and second ECG information, the electronic device 110 may use only a certain region or a certain value to compare and determine the coincidence of the ECG information. Here, the first ECG information is not the information acquired in the past but is the information being acquired currently. The electronic device 110 compares the first and second ECG information on the basis of the ECGs acquired simultaneously, and maintains high accuracy.

For example, the electronic device 110 may calculate at least one of the amplitude factors PL' 16, PQ 17, RQ 18, RS 19, TS 20, and TT' 21, and time duration factors RQ 1, RS 2, RP 3, RL' 4, RP' 5, RT 6, RS' 7, RT' 8, L'P' 9, S'T' 10, ST 11, PQ 12, PT 13, LQ 14, and ST 15 in each of the first and second ECG information to compare the first and second ECG information by use of the calculated factor.

Also, the electronic device 110 may compare only a certain region of the first and second ECG information in determining the coincidence of the first and second ECG. Referring to FIG. 5A, a first region 511 of the first ECG corresponds to a first region 521 of the second ECG, and the ECG information of the two regions 511 and 521 are the same as each other. However, a second region 512 of the first ECG corresponds to a second region 522 of the second ECG, but the ECG information of the two regions 512 and 522 are different from each other. Thus, the electronic device 110 does not establish the pairing with the terminal 120 through the wireless network.

Figure 5B:
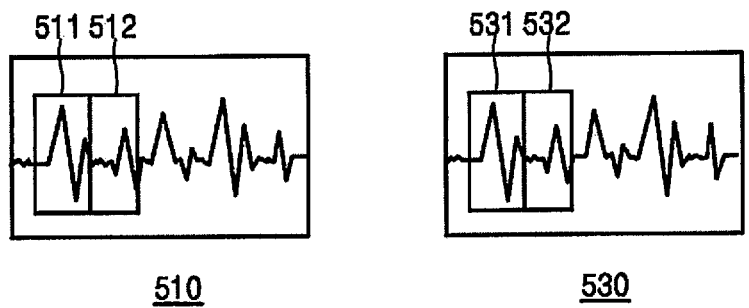
FIG. 5B illustrates an example of ECG comparison which results in success in establishing a wireless communications connection between an electronic device and a terminal, according to an embodiment.

FIG. 5B illustrates an example of ECG comparison which results in a success in establishing the wireless communications connection between the electronic device and the terminal according to an embodiment.

In FIG. 5B, the reference numeral 510 denotes an ECG acquired by the electronic device 110, and a reference numeral 530 denotes an ECG acquired by the terminal 120. Referring to FIG. 5B, the first region 511 of the first ECG corresponds to a first region 531 of the second ECG, and the ECG information of the two regions 511 and 531 are the same as each other. Also, the second region 512 of the first ECG corresponds to a second region 532 of the second ECG, and the ECG information of the two regions 512 and 532 are the same as each other. Thus, the electronic device 110 establishes the pairing with the terminal 120 through the wireless network.

Figure 6:
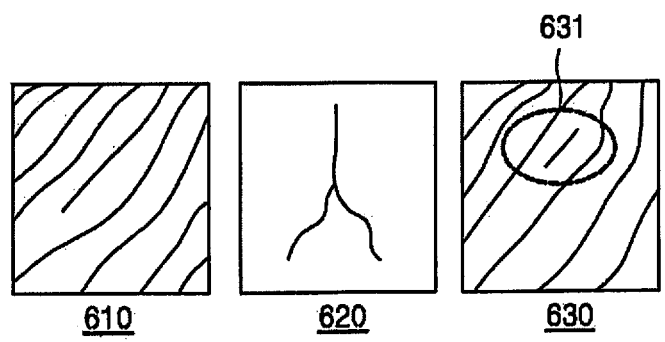
FIG. 6 is a diagram for explaining a fingerprint utilized in establishing a wireless communications connection between an electronic device and a terminal, according to an embodiment.

FIG. 6 is a diagram for explaining a fingerprint utilized in establishing the wireless communications connection between the electronic device and the terminal according to an embodiment.

Generally, the fingerprint information is acquired by extracting positions and features of minutia points including bifurcation and ending of fingerprint ridges. The fingerprint information of each user has unique features and can be used to discriminate the users. The discrimination of the fingerprint information may be performed by an algorithm that compares the extracted features.

The electronic device 110 may acquire the fingerprint information by using electrical conductive characteristics of human skin based on semiconductor technologies. For example, when the user contacts a surface of a semiconductor chip by an end of a finger, the electronic device 110 may acquire the fingerprint information by capturing the unique pattern of the fingerprint contacting the surface of the semiconductor chip and changing into an electrical signal.

The electronic device 110 may transform the fingerprint having unique features of the user into digital values, extract the unique features, and acquire property data. Before extracting the features, image processing that may include, but is not limited to, smoothing, binarization, and thinning may be performed with respect to the to the fingerprint image enhance the image. The smoothing process enhances contrast of the fingerprint image and then reduces noise in the image. The binarization process converts a 256 grayscale fingerprint image into a binary image, in which pixels with a value "0" are displayed as black and pixels with a value "1" are displayed as white. The thinning process reduces the thickness the ridges to a single pixel width.

Unique features of the fingerprint image such as patterns and minutiae may be acquired after thinning the fingerprint image. In particular, the electronic device 110 may acquire at least one of major minutia features of fingerprint ridges including a ridge ending 610, a ridge bifurcation 620, and a short ridge 630 after the image processing of the fingerprint.

Figure 7:
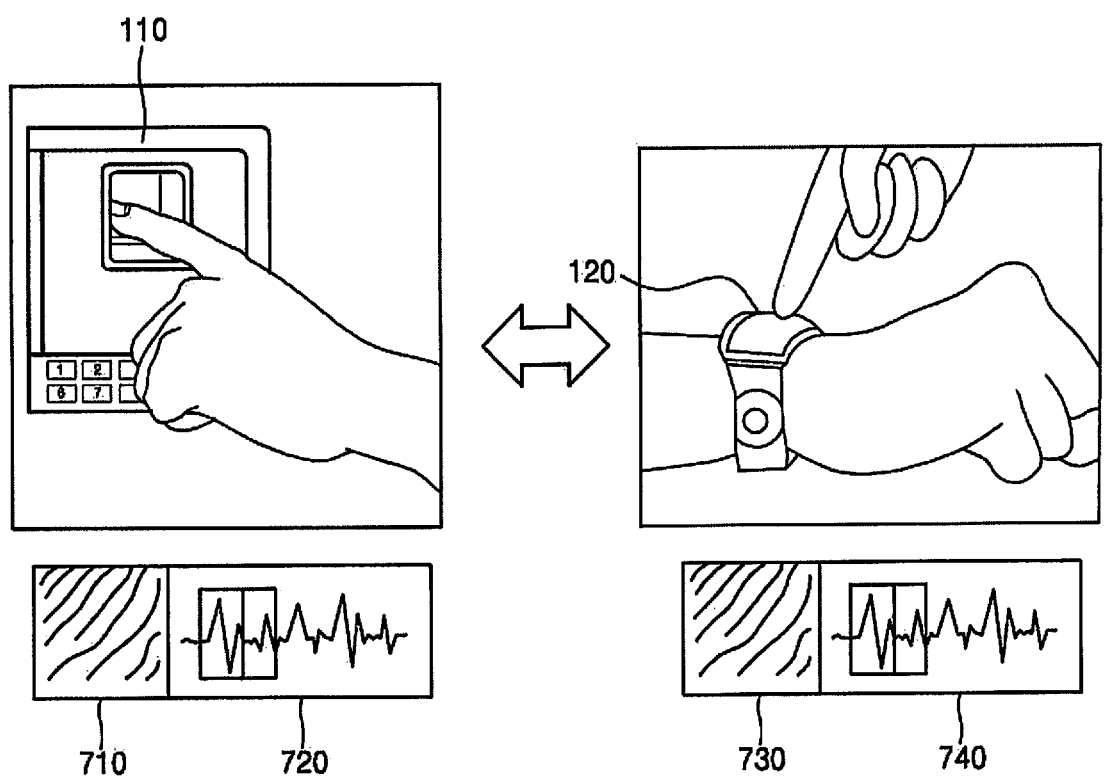
FIG. 7 illustrates establishment of a wireless communications connection between an electronic device and a terminal, according to another embodiment.

FIG. 7 illustrates the establishment of the wireless communications connection between the electronic device and the terminal according to another embodiment.

Referring to FIG. 7, the electronic device 110 may establish the wireless communications connection with the terminal 120 by using the fingerprint information of the user. The sensor of the electronic device 110 senses the physical contact of the user's finger and acquires first fingerprint information based on the sensed contact. Here, the first fingerprint information may include at least one of the pattern and the minutia features such as the ridge ending, the ridge bifurcation, and the short ridge. Those having ordinary skills in the art would appreciate that the first fingerprint information may further include other kinds of information regarding the fingerprint.

Within a certain time from the instant that the sensor of the electronic device 110 acquires the first fingerprint information, the first sub-information of the first fingerprint information may be transmitted to the terminal 120. For an example, the certain time may be within two minutes from the acquisition of the first fingerprint information. The first sub-information may be one of the pattern and the minutia features such as the ridge ending, the ridge bifurcation, and the short ridge in the fingerprint. Meanwhile, the electronic device 110 may transmit an advertisement packet containing the first sub-information of the first fingerprint information to the terminal 120.

The terminal 120 acquires second fingerprint information of the user. Here, the second fingerprint information may be acquired in advance and stored in the terminal 120, or be acquired after the terminal 120 receives the first sub-information of the first fingerprint information and the user contacts a finger directly to the terminal 120 in the prescribed time interval.

In the case that the first sub-information is the pattern information of the fingerprint, the terminal 120 compares the first sub-information of the first fingerprint information with the first sub-information of the second fingerprint information to check whether the two pattern information matches each other or not. If the two pattern information do not match with each other, the terminal 120 does not establish the wireless communications connection with the electronic device 110. If the two pattern information match with each other, the terminal 120 transmits the second sub-information of the second fingerprint information to the electronic device 110. The second sub-information may be the fingerprint information excluding the first sub-information. For example, the second sub-information may be ridge bifurcation information in the fingerprint. Meanwhile, the terminal 120 may transmit an advertisement packet containing the second sub-information of the second fingerprint information to the electronic device 110.

The electronic device 110 receives the second sub-information of the second fingerprint information. The electronic device 110 compares the second sub-information of the first fingerprint information with the second sub-information of the second fingerprint information to check whether the two ridge bifurcation information match with each other or not. If the two ridge bifurcation information do not match with each other, the electronic device 110 does not establish the wireless communications connection with the terminal 120.

If the two ridge bifurcation information match with each other, the electronic device 110 carries out the wireless communications connection with the terminal 120.

Also, the electronic device 110 may perform the wireless communications connection with the terminal 120 by using both the fingerprint information and the ECG information. In this case, the wireless communications connection between the electronic device 110 and the terminal 120 may be established only when the first ECG information of the user acquired by the electronic device 110 is the same as the second ECG information acquired by the terminal 120.

The electronic device 110 may receive the second sub-information of the second fingerprint information from the terminal 120 to compare with the second sub-information of the first fingerprint information, or receive at least one of the first and second sub-information of the second ECG information to compare with corresponding first ECG information. The electronic device 110 may authenticate the user by using either the fingerprint information or the ECG information or using both the fingerprint and ECG information, and perform the establishment of the wireless communications connection with the terminal 120 when the authentication completes successfully. Also, those having ordinary skills in the art would appreciate that the electronic device 110 may perform the establishment of the wireless communications connection with the terminal 120 by using other kinds of biometric information that may take into account the characteristics of the users.

Figure 8:
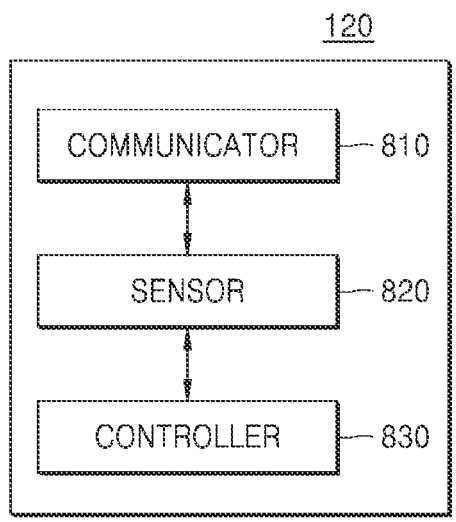
FIG. 8 is a block diagram of a terminal according to an embodiment.

FIG. 8 is a block diagram of the terminal according to an embodiment.

According to the embodiment, the terminal 120 may include a communicator 810, a sensor 820, and a controller 830. The terminal 120 may be implemented to include more elements than those shown in the drawing, or fewer elements than those shown in the drawing. The elements will now be described in detail sequentially below.

The communicator 810 may transmit and receive information to and from an external device. The communicator 810 may receive the first sub-information of the first biometric information from the electronic device 110.

The sensor 820 may acquire the second biometric information of the user who uses the terminal 120. Time between the instant of acquiring the first biometric information of the terminal 120 and the instant of acquiring the second biometric information may be within a certain time interval. The second biometric information may be one acquired from an external device.

The controller 830 may compare the first sub-information of the second biometric information that corresponds to the first sub-information of the first biometric information with the first sub-information of the first biometric information. If it is determined from the comparison that the first sub-information of the second biometric information matches the first sub-information of the first biometric information, the controller 830 may control the communicator 810 to transmit the second sub-information of the second biometric information to the electronic device 110. Here, the controller 830 may control the communicator 810 to include a packet for requesting communications connection between the electronic device 110 and the terminal 120 in the second sub-information of the second biometric information before transmitting the second sub-information of the second biometric information.

The communicator 810 may receive, from the electronic device 110, a packet acknowledging the connection between the electronic device 110 and the terminal 120 and establish a pairing through the wireless network.

Here, the wireless network may be the wireless LAN, the Wifi, the Bluetooth, the Zigbee, the WFD, the UWB, the IrDA, the BLE, or the NFC, but is not limited thereto.

The terminal 120 may include a CPU to generally control the communicator 810, the sensor 820, and the controller 830. The CPU may be implemented by arrays of multiple logic gates or by a combination of a general purpose microprocessor and a memory which stores a program that may be executed by the microprocessor. Those having ordinary skill in the art would appreciate that the CPU may be implemented by other kinds of hardware components.

Various operations performed by the terminal 120 and applications thereof are described below. Explicit subjects such as the communicator 810, the sensor 820, and the controller 830 will be omitted in the description that those having ordinary skill in the art would appreciate clearly without specifying the subjects. It should be noted that the scope of the present disclosure is not limited by naming a physical or logical structure of a certain configuration.

Figure 9:
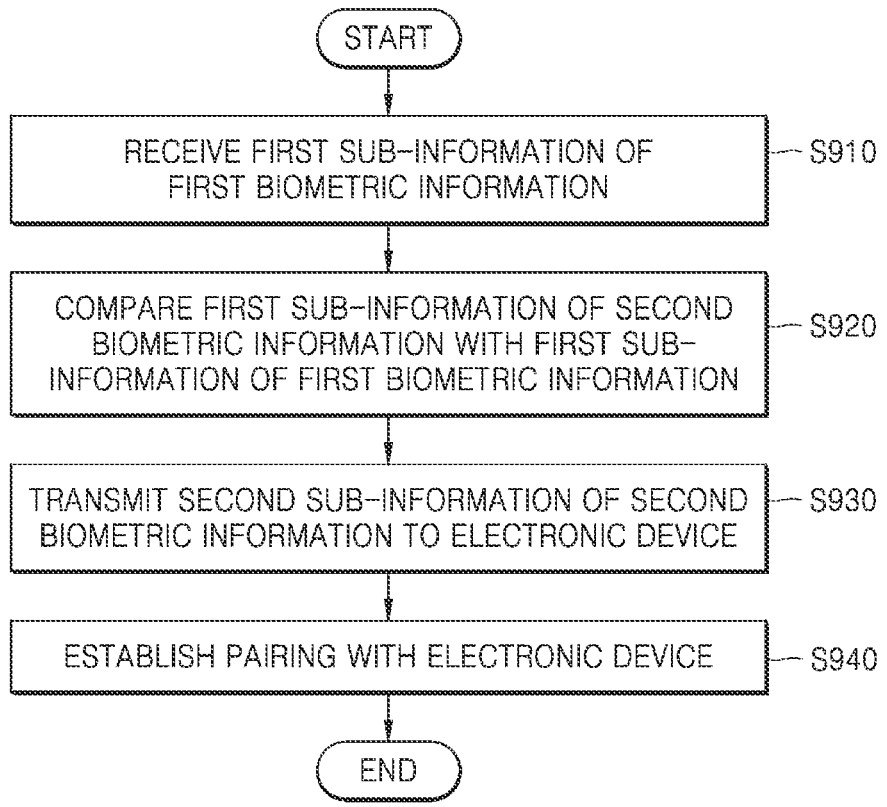
FIG. 9 is a flowchart showing a method for operating a terminal, according to an embodiment.

FIG. 9 is a flowchart showing a method for operating the terminal according to an embodiment.

In operation S910, the terminal 120 receives the first sub-information of the first biometric information from the electronic device 110.

In operation S920, the terminal 120 compares the first sub-information of the second biometric information with the first sub-information of the first biometric information. The terminal 120 acquires the second biometric information of the user who uses the terminal 120. Here, the first sub-information of the second biometric information corresponds to the first sub-information of the first biometric information.

In operation S930, if the first sub-information of the first biometric information matches the first sub-information of the second biometric information, the terminal 120 transmits the second sub-information of the second biometric information to the electronic device 110.

In operation S940, if the second sub-information of the second biometric information matches the second sub-information of the first biometric information, the terminal 120 establishes a pairing with the electronic device 110 through the wireless network.

Figure 10:
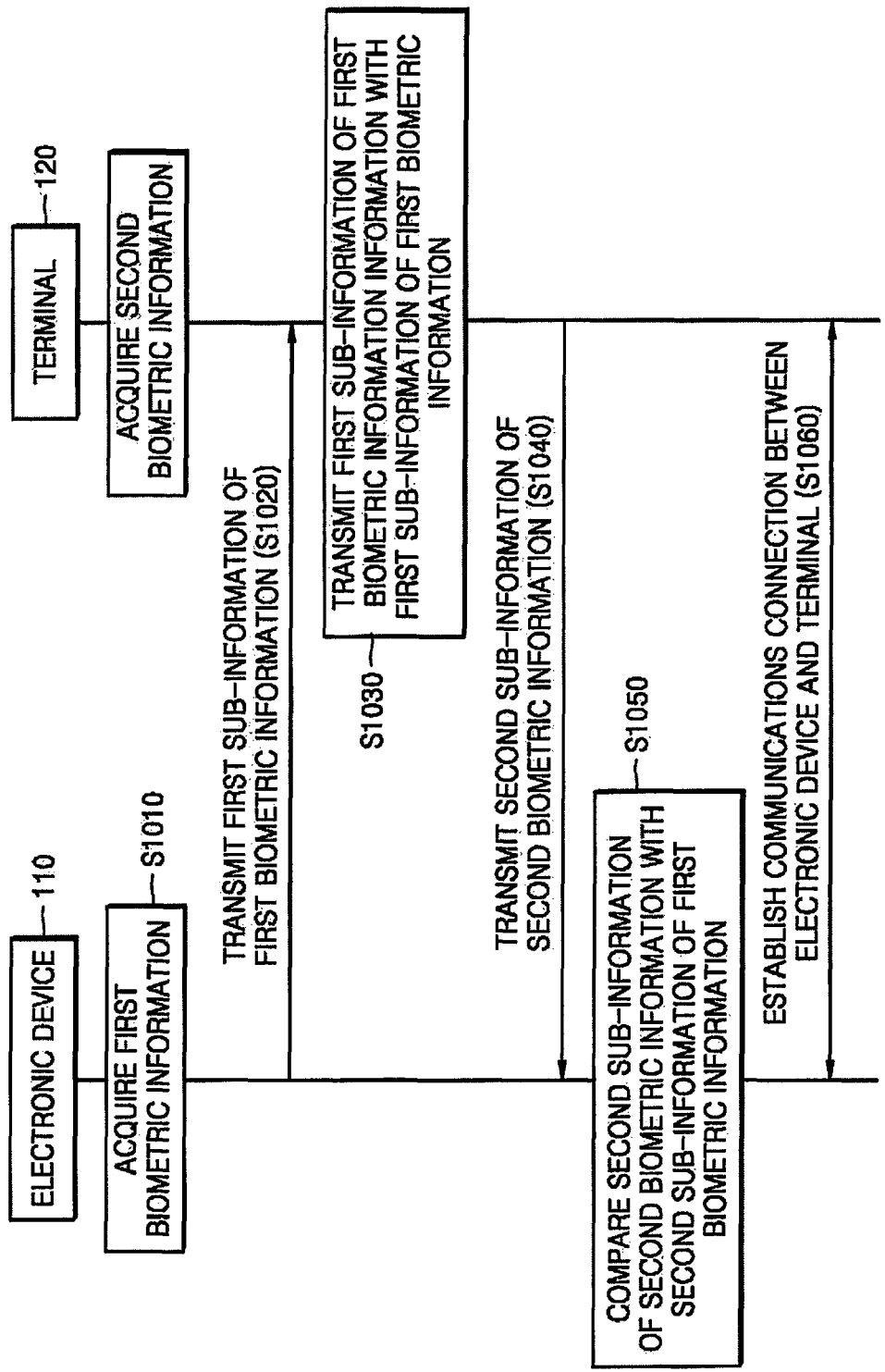
FIG. 10 is a flowchart showing a method of establishing a wireless communications connection between an electronic device and a terminal, according to an embodiment.

FIG. 10 is a flowchart showing a method of establishing the wireless communications connection between the electronic device and the terminal according to an embodiment.

In operation S1010, the electronic device 110 senses the physical contact of the user by a sensor, and acquires the first biometric information based on the sensed physical contact.

In operation S1020, the electronic device 110 transmits the first sub-information of the first biometric information to the terminal 120 within a certain time from the acquisition of the first biometric information. The terminal 120 receives the first sub-information of the first biometric information from the electronic device 110. Also, the terminal 120 may acquire the second biometric information within a certain time from the instant of receiving the first biometric information. Here, the terminal 120 may acquire the second biometric information before the instant of receiving the first biometric information as well.

In operation S1030, the terminal 120 compares the first sub-information of the second biometric information with the first sub-information of the first biometric information. If it is determined from the comparison that the first sub-information of the second biometric information does not match the first sub-information of the first biometric information, the electronic device 110 does not establish the paring with the terminal 120 through the wireless network.

If the first sub-information of the second biometric information matches the first sub-information of the first biometric information, the terminal 120 transmits the second sub-information of second biometric information to the electronic device 110 in operation S1040.

In operation S1050, the electronic device 110 receives the second sub-information of second biometric information from the terminal 120, and compares the second sub-information of second biometric information with the second sub-information of the first biometric information. If it is determined from the comparison that the second sub-information of second biometric information does not match the second sub-information of the first biometric information, the electronic device 110 does not establish the paring with the terminal 120 through the wireless network.

If the second sub-information of second biometric information matches the second sub-information of the first biometric information, the electronic device 110 establishes the paring with the terminal 120 through the wireless network in operation S1060.

For an example of the electronic device 110 and the terminal 120, a user may pay a charge by contacting an appropriate part of the body to card payment terminal without taking out a card. Here, the card and the card payment terminal correspond to the terminal 120 and the electronic device 110, respectively. The wireless communications connection is established between the card and the card payment terminal by a simple physical contact of the user, and then the payment may be completed easily.

Also, a user may open a door of the car or the house by contacting an appropriate part of the body to a sensor without taking out a smart key or a house key or entering password into a door lock.

Establishment of the wireless communications connection between the electronic device 110 and the terminal 120 using the biometric information does not require any additional input entry of the user and may enhance the security. Thus, the establishment of the wireless communications connection using the biometric information may be utilized in various applications such as payments, securities, and device connections.

Figure 11:
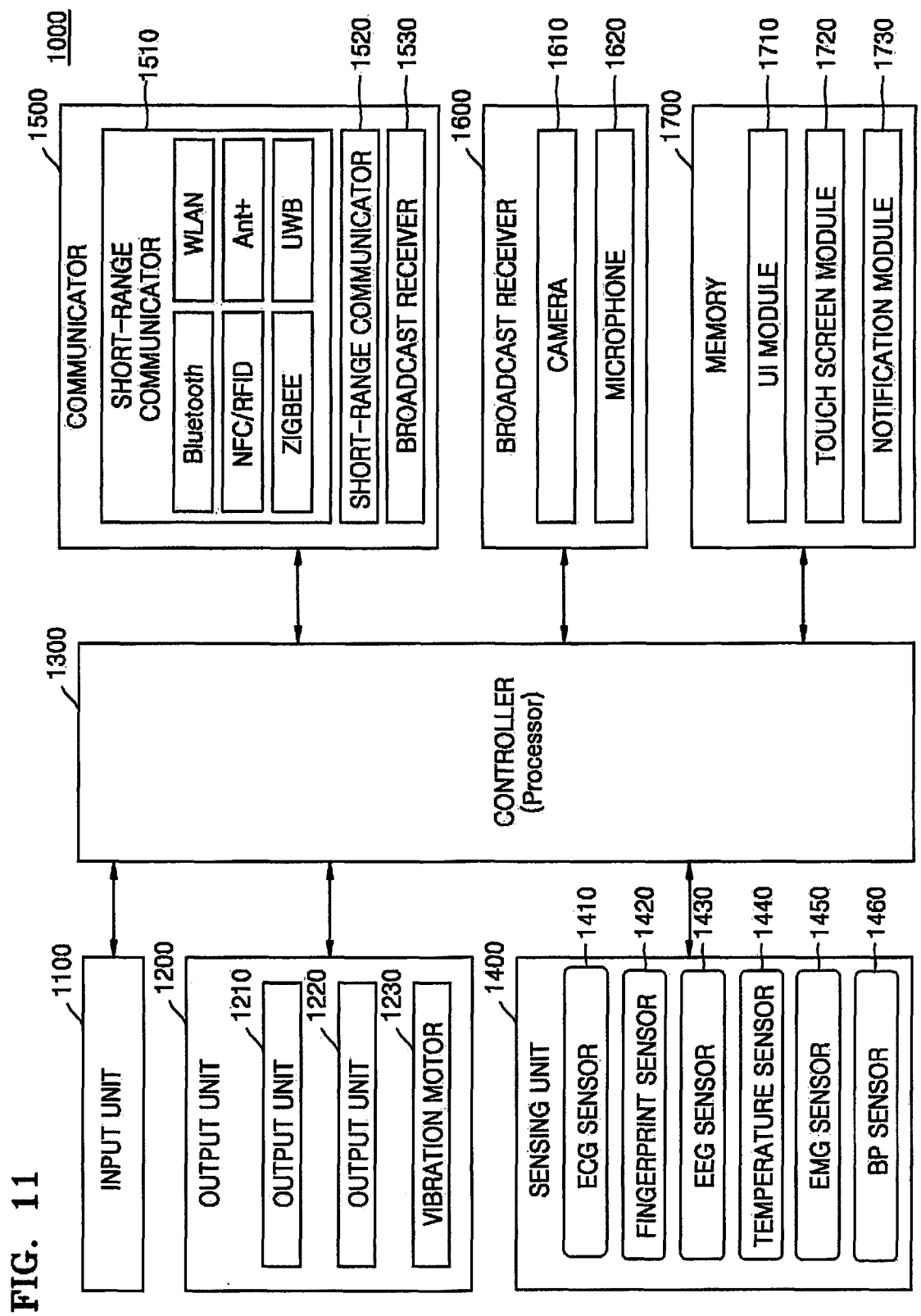
FIG. 11 is a detailed block diagram of a terminal for implementing the present disclosure according to an embodiment.

FIG. 11 is a detailed block diagram of a terminal for implementing the present disclosure according to an embodiment.

The terminal 1000 shown in FIG. 11 may correspond to the electronic device 110 of FIG. 2. In other words, a sensing unit 1400, a communicator 1500, and a controller 1300 shown in FIG. 11 may correspond to the sensor 210, the communicator 220, and the controller 230, respectively, shown in FIG. 2.

Also, the terminal 1000 shown in FIG. 11 may correspond to the terminal 120 of FIG. 8. In other words, the communicator 1500, the sensing unit 1400, and the controller 1300 shown in FIG. 11 may correspond to the sensor 810, the communicator 820, and the controller 830, respectively, shown in FIG. 8.

An input unit 1100 may be used to receive user input for controlling the terminal 1000. Examples of the input unit 1100 may include, but is not limited to, a keypad, a dome switch, a touchpad, a jog wheel, and a jog switch. In particular, the touchpad may be one of various types: capacitive overlay, resistive overlay, infrared beam, surface acoustic wave, integral strain gauge, and piezoelectric types.

An output unit 1200 may output audio signal, video signal, or vibrational signal. The output unit 1200 may include a display 1210, an acoustic output unit 1220, and a vibration motor 1230.

The display 1210 may include at least one of: a liquid crystal display (LCD), a thin film transistor-liquid crystal display (TFT-LCD), an organic light-emitting diode (OLED) display, a flexible display, a three dimensional (3D) display, and an electrophoretic display. The terminal 1000 may include two or more displays 1210 depending on its implementation. Here, the displays 1210 may be disposed to face each other by use of a hinge.

The acoustic output unit 1220 outputs audio data received from the communicator 1500 or stored in a memory 1700. The acoustic output unit 1220 outputs acoustic sound related with operations performed by the terminal 1000 such as ringtones, message ringtones, and notification sounds. The acoustic output unit 1220 may include a speaker and a buzzer.

The vibration motor 1230 may generate vibrations. For example, the vibration motor 1230 may output vibrations corresponding to video outputs or audio outputs such as the ringtone and the message ringtone. Also, the vibration motor 1230 may output vibrations when a touch input is applied to a touch screen.

A controller 1300 may control overall operation of the terminal 1000. For example, the controller 1300 may control functional blocks of the terminal 1000 by executing programs stored in a memory 1700.

The sensing unit 1400 may sense the physical contact of the user and acquire the biometric information based on the sensed physical contact. The sensing unit 1400 may include, but is not limited to, an ECG sensor 1410, a fingerprint sensor 1420, an EEG sensor 1430, a temperature sensor 1440, an EMG sensor 1450, and a blood pressure sensor 1460. Each of the sensors will not be described in detail because the function of each sensor is readily deductable intuitively from the name of the sensor.

The communicator 1500 may include at least one element for performing communications between the terminal 1000 and an external device (not shown in the drawing). For example, the communicator 1500 may include a short-range wireless communicator 1510, a mobile communicator 1520, and a broadcast receiver 1530.

The short-range wireless communicator 1510 may include, but is not limited to, a Bluetooth communicator, a BLE communicator, a wireless LAN communicator, an NFC unit, an Ant+ communicator, a Zigbee communicator, an IrDA communicator, a Wifi communicator, WFD communicator, and an UWB communicator.

The mobile communicator 1520 transmits and receives wireless signals to and from at least one of: a base station of a mobile communications network, an external terminal 1000, and a server. Here, the wireless signals may include various kinds of data related with transmission and receipt of voice call signals, video call signals, text messages, or multimedia messages.

The broadcast receiver 1530 receives broadcast signals and/or broadcast related information through broadcast channels. The broadcast channels may include satellite broadcast channels and terrestrial broadcast channels. The broadcast receiver 1530 may not be included in the terminal 1000 depending on the implementation of the terminal 1000.

An audio/video (NV) input unit 1600 receives audio signals or video signals and may include a camera 1610 and a microphone 1620. The camera 1610 may acquire still images or video frames of a moving picture through an image sensor in a video call mode or a photograph mode. The images captured through the image sensor may be processed by the controller 1300 or a separate image processor not shown in the drawing.

The video frames processed by the camera 1610 may be stored in the memory 1700 or transmitted externally through the communicator 1500. The camera 1610 may be provided in a plurality depending on the implementations.

The microphone 1620 captures external sounds and transforms the sound into electric sound signals. For example, the microphone 1620 may receive voices from an external device or a caller. The microphone 1620 may utilize various noise reduction algorithms to reduce noises introduced during the input of the external sounds.

The memory 1700 may store programs for processing and control operations of the controller 1300 and data input to the terminal 1000 or output from the terminal 1000.

The memory 1700 may include at least one type of storing medium among: a flash memory, a hard disk, a multimedia card micro, a card-type memory such as a SD or XD memory, a RAM, a ROM, an EEPROM, a PROM, a magnetic memory, a magnetic disc, and an optical disk.

The programs stored in the memory 1700 may be categorized into a plurality of modules, according to their functions, such as a User Interface (UI) module 1710, a tough screen module 1720, and a notification module 1730, for example.

The UI module 1710 may provide a user interface or graphic user interface that is specialized for each application and interacts with the terminal 1000. The tough screen module 1720 senses touch gestures on a tough screen of the user, and may transfer the touch gesture information to the controller 1300. The touch screen module 1720 according to some embodiments may recognize and analyze touch codes. The touch screen module 1720 may be configured as a separate hardware including the controller.

Various sensors may be provided in or near the touch screen to sense a touch or a hovering of the touch screen. One example of the sensor for sensing the touch of the touch screen may be a tactile sensor. The tactile sensor refers to a sensor that detects the stimulus of a contact on a specific object in a human sensitivity or higher. The tactile sensor may detect various information such as the roughness of a touched surface, the hardness of a touching body, and the temperature of a touched position.

Another example of the sensor for sensing the touch of the touch screen may be a proximity sensor. The proximity sensor refers to a sensor that detects the presence of an object approaching a certain detection surface or a nearby object by use of electromagnetic field intensity or infrared ray without any physical contact. Examples of the proximity sensor include a through-beam photoelectric sensor, a diffuse-reflective photoelectric sensor, a retro-reflective photoelectric sensor, a high frequency oscillation proximity sensor, a capacitance proximity sensor, a magnetic proximity sensor, and an infrared proximity sensor. The touch gestures of the user may include 'tap', 'double tap', 'to touch and hold', 'to drag item', 'to slide finger', 'to flick finger', 'to drag and drop item', and 'to swipe'.

The notification module 1730 may generate a signal for notifying an event happened in the terminal 1000. The events happening in the terminal 1000 include receiving a call, receiving a message, a key input entry, and a schedule notification. The notification module 1730 may output notifications in a video form through the display 1210, in an audio form through the acoustic output unit 1220, or in vibrations through the vibration motor 1230.

The devices described above may be formed of a hardware component, a software component, and/or a combination of the hardware component and the software component. For example, the devices and the components according to the one or more of the above embodiments may be embodied by using one or more general-purpose computers or special-purpose computers, such as a processor, a controller, an arithmetic logic unit (ALU), a digital signal processor, a microcomputer, a field programmable array (FPA), a programmable logic unit (PLU), a microprocessor, or any other devices which may execute and respond to instructions.

A processing device may run an operating system (OS) and one or more software applications that operate under the OS. Also, the processing device may access, store, manipulate, process, and generate data while executing the software applications.

For simplicity, the singular term "processing device" may be used in the description, but those having ordinary skill in the art will appreciate that the processing device may include multiple processing elements and/or multiple types of processing elements. For example, the processing device may include a plurality of processors or, alternatively, one processor and one controller. In addition, different processing configurations are possible, such as parallel processors or multi-core processors.

Software may include a computer program, a piece of code, an instruction, or some combination thereof, for independently or collectively instructing or configuring the processing device to perform one or more desired operations.

Software and/or data may be embodied permanently or temporarily in any type of machine, component, physical or virtual equipment, computer storage medium or device, or a propagated signal wave capable of providing instructions or data to or being interpreted by the processing device. The software may be distributed over network-coupled computer systems so as to be stored and executed in a distributed fashion. The software and data may be stored in one or more non-transitory computer-readable storage media.

The methods according to one or more embodiments may be implemented as computer instructions which can be executed by various computing devices, and recorded on a non-transitory computer-readable medium. The computer-readable medium may include program commands, data files, data structures or a combination thereof. Program instructions recorded on the medium may be particularly designed and structured for the inventive concept or available to those of ordinary skill in computer software.

Examples of a non-transitory computer-readable recording medium include magnetic media such as a hard disk, a floppy disk, and a magnetic tape; optical media such as a compact disk-read only memory (CD-ROM) and a digital versatile disc (DVD); magneto-optical media such as a floptical disk; a read-only memory (ROM); a random access memory (RAM); and a flash memory. The medium may be a transmission medium, such as an optical or metal line, or a waveguide transferring program commands, data structures, and the like.

Program commands may include, for example, a high-level language code that can be executed by a computer using a compiler or an interpreter, as well as a machine language code generated by a complier.

The hardware devices may be replaced by software modules that are executable to perform the operation of the embodiments, and vice versa.

While one or more embodiments have been described with reference to the figures, it should be understood that the foregoing description is illustrative and not restrictive. Those of ordinary skill in the art will appreciate that many obvious changes or modifications can be made from the foregoing description without departing from its spirit or essential characteristics. For example, sequences of the operations may be changed as required. Also, the components such as the system, the device, structure, and circuits may be combined or aggregated with other components or replaced by other components or equivalents thereof without significant changes in result.

Accordingly, the scope of the invention should not limited by the embodiments, but be interpreted in the light of the following appended claims and equivalents thereof.

What is claimed is:

1. A method of operating an electronic device, the method comprising:
   acquiring, first biometric information and third biometric information by sensing a physical contact of a user of the electronic device, wherein the third biometric information is a different type than the first biometric information;
   periodically broadcasting first sub-information of the first biometric information to a wearable terminal worn by the user within a certain time from an instant of acquiring the first biometric information, wherein the first sub-information of the first biometric information is partial information of the first biometric information;
   receiving, from the wearable terminal, a connection request including second sub-information of fourth biometric information that is a different type than the first biometric information, when the first sub-information of the first biometric information matches first sub-information of second biometric information obtained from the wearable terminal worn by the user, wherein the second biometric information is a same type as the first biometric information and the fourth biometric information is a same type as the third biometric information;
   comparing second sub-information of the third biometric information with the second sub-information of the fourth biometric information, based on the connection request, wherein the second sub-information of the third biometric information is partial information of the third biometric information, and the second sub-information of the fourth biometric information is partial information of the fourth biometric information; and
   based on a comparison result that the second sub-information of the third biometric information matches the second sub-information of the fourth biometric information, determining whether to establish a pairing with the wearable terminal through a wireless network.

2. The method of claim 1, wherein the first biometric information comprises electrocardiogram information,
   wherein the second biometric information comprises a same type of information as the first biometric information,
   wherein the third biometric information comprises fingerprint information, and
   wherein the fourth biometric information comprises a same type of information as the third biometric information.

3. The method of claim 1, wherein the second biometric information and the fourth biometric information comprises a signal acquired at the wearable terminal within the certain time from the instant of acquiring the first biometric information.

4. The method of claim 1, wherein the first biometric information comprises electrocardiogram information, and
   wherein the first sub-information of the first and second biometric information comprise at least one of:
   amplitude information,
   duration information, or
   angle information of respective electrocardiograms.

5. The method of claim 1, wherein the first biometric information comprises fingerprint information, and
   wherein the first sub-information of the first and second biometric information comprises at least one of pattern information or minutiae information of respective fingerprints.

6. A method of operating a wearable terminal worn by a user, the method comprising:
   acquiring first sub-information of first biometric information from an electronic device, wherein the first biometric information is acquired based on a physical contact of the user of the electronic device, wherein the first sub-information of the first biometric information is partial information of the first biometric information;
   acquiring second biometric information and fourth biometric information of the user who uses the wearable terminal by sensing a physical contact of the user of the wearable terminal, wherein the fourth biometric information is a different type than the second biometric information;
   comparing first sub-information of the second biometric information with the first sub-information of the first biometric information, wherein the first sub-information of the second biometric information is partial information of the second biometric information, and the second biometric information is a same type as the first biometric information;
   based on a comparison result that the first sub-information of the second biometric information matches the first sub-information of the first biometric information, transmitting a connection request including second sub-information of the fourth biometric information that is a different type than the first biometric information to the electronic device; and
   receiving a signal for acknowledging a connection between the electronic device and the wearable terminal from the electronic device in response to the connection request, when the second sub-information of the fourth biometric information matches second sub-information of third biometric information stored in the electronic device,
   wherein the second sub-information of the third biometric information is partial information of the third biometric information, and the second sub-information of the fourth biometric information is partial information of the fourth biometric information.

7. The method of claim 6, wherein the first biometric information comprises electrocardiogram information,
   wherein the second biometric information comprises a same type of signal as the first biometric information,
   wherein the third biometric information comprises fingerprint information, and
   wherein the fourth biometric information comprises a same type of signal as the third biometric information.

8. The method of claim 6, wherein the first sub-information of the first biometric information is acquired from the electronic device within a certain time from an instant that the electronic device acquires the first sub-information of the first biometric information.

9. An electronic device comprising:
   a sensor;
   a communicator configured to communicate with a wearable terminal; and
   at least one processor;
   wherein the at least one processor is configured to:

acquire first biometric information and third biometric information by sensing a physical contact of a user of the electronic device, wherein the third biometric information is a different type than the first biometric information;

broadcast first sub-information of the first biometric information periodically to the wearable terminal worn by the user within a certain time from an instant of acquiring the first biometric information, wherein the first sub-information of the first biometric information is partial information of the first biometric information;

receive, from the wearable terminal, a connection request including second sub-information of fourth biometric information that is different type than the first biometric information, when the first sub-information of the first biometric information matches first sub-information of second biometric information obtained from the wearable terminal worn by the user, wherein the second biometric information is a same type as the first biometric information and the fourth biometric information is a same type as the third biometric information;

compare second sub-information of the third biometric information with the second sub-information of the fourth biometric information, based on the connection request, wherein the second sub-information of the third biometric information is partial information of the third biometric information, and the second sub-information of the fourth biometric information is partial information of the fourth biometric information; and based on a comparison result that the second sub-information of the third biometric information matches the second sub-information of the fourth biometric information, determine whether to establish a pairing with the wearable terminal through a wireless network.

10. The electronic device of claim 9, wherein the first biometric information comprises electrocardiogram information,
wherein the second biometric information comprises a same type of information as the first biometric information,
wherein the third biometric information comprises fingerprint information, and
wherein the fourth biometric information comprises a same type of information as the third biometric information.

11. The electronic device of claim 9, wherein the second biometric information and the fourth biometric information comprise a signal acquired at the wearable terminal within the certain time from the instant of acquiring the first biometric information.

* * * * *